United States Patent
Lee et al.

(10) Patent No.: US 11,475,893 B2
(45) Date of Patent: Oct. 18, 2022

(54) VEHICLE AND A CONTROL METHOD THEREOF

(71) Applicants: HYUNDAI MOTOR COMPANY, Seoul (KR); KIA MOTORS CORPORATION, Seoul (KR)

(72) Inventors: Jeong-Eom Lee, Yongin-si (KR); Youngmin Park, Gunpo-si (KR); Seona Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 190 days.

(21) Appl. No.: 16/584,197

(22) Filed: Sep. 26, 2019

(65) Prior Publication Data
US 2020/0202862 A1    Jun. 25, 2020

(30) Foreign Application Priority Data
Dec. 19, 2018  (KR) .......................... 10-2018-0164763

(51) Int. Cl.
| | |
|---|---|
| G10L 15/26 | (2006.01) |
| H04M 1/60 | (2006.01) |
| G10L 15/22 | (2006.01) |
| H04M 3/436 | (2006.01) |

(52) U.S. Cl.
CPC .............. *G10L 15/26* (2013.01); *G10L 15/22* (2013.01); *H04M 1/6091* (2013.01); *H04M 3/436* (2013.01); *G10L 2015/228* (2013.01)

(58) Field of Classification Search
USPC .......................... 704/246, 247, 251, 252, 275
See application file for complete search history.

(56) References Cited

U.S. PATENT DOCUMENTS

| | | | | |
|---|---|---|---|---|
| 9,826,083 | B2 * | 11/2017 | Kanevsky | H04W 12/02 |
| 2002/0196911 | A1 * | 12/2002 | Gao | H04M 3/4931 379/88.03 |
| 2004/0190687 | A1 * | 9/2004 | Baker | H04M 3/4933 379/88.01 |
| 2006/0025995 | A1 * | 2/2006 | Erhart | G10L 15/1822 704/239 |
| 2010/0144439 | A1 * | 6/2010 | Watanabe | A63F 13/12 463/40 |
| 2011/0311038 | A1 * | 12/2011 | Faizakov | H04M 3/4931 379/211.02 |
| 2012/0269338 | A1 * | 10/2012 | Blanchard | H04M 3/5166 379/265.11 |

(Continued)

FOREIGN PATENT DOCUMENTS

JP        2002-325279    *  8/2002   .............. H04M 1/00

*Primary Examiner* — Leonard St. Cyr
(74) *Attorney, Agent, or Firm* — Lempia Summerfield Katz LLC (57) ABSTRACT

A vehicle includes a communication device configured to communicate with a user terminal. The vehicle further includes an input processor configured to recognize a voice of a telephone call received by the user terminal and generate a voice recognition result on the voice of the telephone call. The vehicle also includes a dialogue manager configured to determine telephone call contents based on the voice recognition result and determine whether or not to provide the telephone call contents to a user based on the telephone call contents.

16 Claims, 4 Drawing Sheets

(56) References Cited

U.S. PATENT DOCUMENTS

| | | | | |
|---|---|---|---|---|
| 2013/0110510 A1* | 5/2013 | Klein | .................. | G10L 15/26 |
| | | | | 704/235 |
| 2014/0058831 A1* | 2/2014 | Duva | .................. | H04M 3/51 |
| | | | | 705/14.45 |
| 2014/0214530 A1* | 7/2014 | Duva | ................ | G06Q 30/0246 |
| | | | | 705/14.45 |
| 2015/0134340 A1* | 5/2015 | Blaisch | ................ | G06F 16/958 |
| | | | | 704/275 |
| 2016/0036969 A1* | 2/2016 | Kau | ................ | H04M 3/42221 |
| | | | | 379/85 |
| 2017/0084271 A1* | 3/2017 | Nakadai | .................. | G06F 3/16 |
| 2017/0094049 A1* | 3/2017 | Kanevsky | ............. | G06F 21/32 |
| 2018/0124256 A1* | 5/2018 | Kawamura | ............. | G06F 3/01 |
| 2019/0058791 A1* | 2/2019 | Bitou | ................ | H04M 3/5158 |
| 2019/0075204 A1* | 3/2019 | Indyk | .................. | G10L 25/63 |
| 2021/0075902 A1* | 3/2021 | Kawamura | ....... | H04M 1/72454 |

\* cited by examiner

VEHICLE AND A CONTROL METHOD THEREOF

CROSS-REFERENCE TO RELATED APPLICATION(S)

This application is based on and claims priority under 35 U.S.C. § 119 to Korean Patent Application No. 10-2018-0164763, filed on Dec. 19, 2018, in the Korean Intellectual Property Office, the present disclosure of which is incorporated by reference herein in its entirety.

BACKGROUND

1. Technical Field

The present disclosure relates to a vehicle and a control method thereof for performing communication with a user terminal.

2. Description of the Related Art

Recently, as a result of exposure of a user's phone number information, spam phone calls containing advertisement or unwanted information frequently occur. In order to distinguish whether the phone call is a spam call, conventionally, the caller information is provided to the user, and the user then uses the caller information to determine whether the received phone call is a spam call.

On the other hand, there may be a case where the information that the phone call attempts to provide may be useful to the user. In this case, inconveniently, the user needs to decide through the phone conversation with the other party whether or not the information provided is useful. In particular, when the user is unable to answer or make a telephone call due to driving or the like, there may be an inconvenience in that the information of the received telephone call may be not provided or available to the user.

SUMMARY

It is an aspect of the present disclosure to provide a vehicle and a control method thereof capable of performing communication with a user terminal.

Additional aspects of the present disclosure are set forth in part in the description which follows and, in part, can be understood from the description, or may be learned by practice of the present disclosure.

In accordance with an aspect of the present disclosure, a vehicle includes a communication device configured to communicate with a user terminal. The vehicle further includes an input processor configured to recognize a voice of a telephone call received by the user terminal and generate a voice recognition result on the voice of the telephone call. The vehicle also includes a dialogue manager configured to determine telephone call contents based on the voice recognition result and determine whether or not to provide the telephone call contents to the user based on the telephone call contents.

The dialogue manager may determine whether or not a decision making is necessary based on the voice recognition result and may request the user to input a confirmation command when the decision making is necessary.

The dialogue manager may determine that the decision making is necessary when the other party of the telephone call requests an answer of the user.

The dialogue manager may determine a recommendation score for the telephone call contents based on the telephone call contents and may determine whether or not to provide the telephone call contents to the user based on the recommendation score.

The dialogue manager may compare the telephone call contents and user information and may determine the recommendation score based on the comparison result.

The dialogue manager may provide the telephone call contents to the user when the recommendation score exceeds a predetermined reference score.

The dialogue manager may recommend a telephone call to the user when the recommendation score exceeds a predetermined reference score.

The dialogue manager may determine whether or not a telephone call end point has been reached based on the voice recognition result and may terminate the telephone call when the telephone call end point is reached.

The dialogue manager may provide the telephone call contents to the user when the telephone call end point is reached.

The input processor may recognize the voice of the telephone call when a telephone call delegation command for a call received by the user terminal is received.

In accordance with another aspect of the present disclosure, a control method of a vehicle includes recognizing a voice of a telephone call received by a user terminal and generating a voice recognition result on the voice of the telephone call. The control method further includes determining telephone call contents based on the voice recognition result. The control method also includes determining whether or not to provide the telephone call contents to a user based on the telephone call contents.

The control method may further include determining whether or not a decision making is necessary based on the voice recognition result. The control method may further include requesting the user to input a confirmation command when the decision making is necessary.

The determining of whether or not a decision making is necessary may include determining that the decision making is necessary when the other party of the telephone call requests an answer of the user.

The determining of whether or not to provide the telephone call contents to the user based on the telephone call contents may include determining a recommendation score for the telephone call contents based on the telephone call contents and may include determining whether or not to provide the telephone call contents to the user based on the recommendation score.

The determining of the recommendation score for the telephone call contents may include comparing the telephone call contents and user information and determining the recommendation score based on the comparison result.

The determining of whether or not to provide the telephone call contents to the user based on the recommendation score may include providing the telephone call contents to the user when the recommendation score exceeds a predetermined reference score.

The control method may further include recommending a telephone call to the user when the recommendation score exceeds a predetermined reference score.

The control method may further include determining whether or not a telephone call end point has been reached based on the voice recognition result and may further include terminating the telephone call when the telephone call end point is reached.

The terminating of the telephone call may include providing the telephone call contents to the user when the telephone call end point is reached.

The generating of the voice recognition result on the voice of the telephone call may include recognizing the voice of the telephone call when a telephone call delegation command for the call received by the user terminal is received.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Like reference numerals refer to like elements throughout the specification. This specification does not describe all the elements of the embodiments. Duplicative contents between general contents or embodiments in the technical field of the present disclosure are omitted. The terms 'part,' 'module,' 'member,' and 'block' used in this specification may be embodied as software or hardware. It is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter the working principle and embodiments of the present disclosure is described below with reference to the accompanying drawings.

Figure 1:
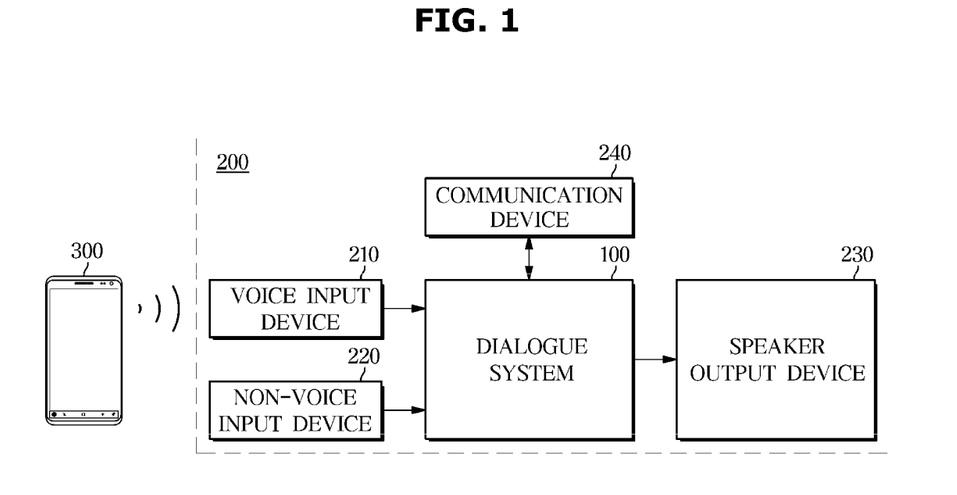
FIG. 1 is a diagram illustrating a relationship between a user terminal and components of a vehicle according to an embodiment of the present disclosure.

FIG. 1 is a diagram illustrating a relationship between a user terminal and components of a vehicle according to an embodiment of the present disclosure.

Referring to FIG. 1, a user terminal 300 according to an embodiment of the present disclosure may perform communication with a vehicle 200.

Data related to the phone call received by the user terminal 300 may be transmitted to the vehicle 200. A user may answer a call within the vehicle 200 through the communication connection between the user terminal 300 and the vehicle 200.

The user terminal 300 may be implemented as a computer or a portable terminal that may access the vehicle 200 through a network. The computer may include, for example, a notebook, a desktop, a laptop, a tablet PC, a slate PC, and the like with a web browser (WEB Browser), and the portable terminal, which is a wireless communication device with guaranteed portability and mobility, may include all kinds of handheld based wireless communication devices such as a PCS (Personal Communication System), a GSM (Global System for Mobile communication), a PDC (Personal Digital Cellular), a PHS (Personal Handyphone System), a PDA (Personal Digital Assistant), an IMT (International Mobile Telecommunication)-2000, a CDMA (Code Division Multiple Access)-2000, an W-CDMA (W-Code Division Multiple Access), an WiBro (Wireless Broadband Internet) terminal, and a smart phone, and wearable devices such as a watch, a ring, a bracelet, an anklet, a necklace, a pair of glasses, a contact lens, and a head-mounted device (HMD).

When the user responds to a telephone call received by the user terminal 300, the user may answer the telephone call. The voice of the telephone call received by the user terminal 300 in the course of the telephone call, in other words, the voice of the other party of the received telephone call, may be recognized by the vehicle 200.

The vehicle 200 may include a voice input device 210, a non-voice input device 220, a communication device 240, a speaker output device 230, and a dialogue system 100.

The voice of the telephone call received by the user terminal 300 may be input through the voice input device 210 provided in the vehicle 200. The voice input device 210 may also receive a user command as voice.

To this end, the voice input device 210 may include a microphone for receiving sound, converting the sound into an electrical signal, and outputting the electrical signal.

Commands other than the voice command of the user or the voice of the telephone call may be input through the non-voice input device 220.

The non-voice input device 220 may include a hardware device such as various buttons or switches, a pedal, a keyboard, a mouse, a track-ball, various levers, a handle, a stick, and the like for the user's input. For example, the non-voice input device 220 may include an input button and a jog shuttle for receiving commands through the operation of the user.

The non-voice input device 220 may also include a graphical user interface (GUI) such as a touch pad for the user input, e.g., a software device. In this case, the touch pad may be implemented as a touch screen panel (TSP).

The dialogue system 100 determines the users intention and situation using the voice of the user input through the voice input device 210 or the voice of the telephone call received by the user terminal 300. The dialogue system 100 also determines the user's intention and situation using the non-voice input of the user input through the non-voice input device 220. The dialogue system 100 outputs a response for performing an action corresponding to the intention of the user.

The dialogue system 100 may refer to a control device that performs a series of operations for outputting a response.

The dialogue system 100 may be implemented as a memory for storing an algorithm for controlling the operation of components in the vehicle 200 or data about a program reproducing the algorithm and a processor for performing the above-described operations using the data stored in the memory. In this case, the memory and the processor may each be implemented as separate chips. Alternatively, the memory and the processor may be implemented as a single chip.

The speaker output device 230, which is a device that provides a visual, auditory, or tactile output to a talker, may provide an auditory output to the caller of the phone received by the user terminal 300, that is, to the other party of the telephone call, as well as to the user.

To this end, the speaker output device 230 may include a display (not shown) and a speaker (not shown) provided in the vehicle 200. The display (not shown) and the speaker (not shown) may visually or acoustically output a response to the utterance of a user, a query of the user, information to be provided to the user, confirmation of the decision of the user, and a response to the utterance of the other party of the telephone call.

The vehicle 200 may perform communication with an external device other than the user terminal 300 as well as perform communication with the user terminal 300 through the communication device 240.

The communication device 240 may receive information obtained from an external device, for example, user information such as a driver's personal information and external information such as traffic conditions, weather, and temperature, as well as information related to the telephone call from the user terminal 300.

To this end, the communication device 240 may include one or more components that may perform communication with the user terminal 300 or an external device. The communication device 240 may, for example, include at least one of a short-range communication module, a wired communication module, or a wireless communication module.

The short-range communication module may include various short-range communication modules that transmit and receive signals using a wireless communication network in a short distance such as a Bluetooth module, an infrared communication module, an RFID (Radio Frequency Identification) communication module, a WLAN (Wireless Local Access Network) communication module, an NFC communication module, and a ZigBee communication module.

The wired communication module may include various wired communication modules such as a CAN (Controller Area Network) communication module, a LAN (Local Area Network) module, a WAN (Wide Area Network) module, or a VAN (Value Added Network) module, as well as various cable communication modules such as a USB (Universal Serial Bus), an HDMI (High Definition Multimedia Interface), a DVI (Digital Visual Interface), an RS-232 (recommended standard 232), power line communication, or a POTS (plain old telephone service).

The wireless communication module, in addition to the Wi-Fi module and the wireless broadband module, may include wireless communication modules supporting various wireless communication methods such as a GSM (Global System for Mobile Communication), a CDMA (Code Division Multiple Access), a WCDMA (Wideband Code Division Multiple Access), a UMTS (Universal Mobile Telecommunications System), a TDMA (Time Division Multiple Access), and LTE (Long Term Evolution).

The wireless communication module may include a wireless communication interface including an antenna and a transmitter for transmitting signals. The wireless communication module may further include a signal conversion module for modulating the digital control signal output from the dialogue system 100 through the wireless communication interface according to the control of the dialogue system 100 into an analog type wireless signal.

The wireless communication module may include a wireless communication interface including an antenna and a receiver for receiving signals. The wireless communication module may further include a signal conversion module for demodulating the analog type wireless signal received through the wireless communication interface into a digital control signal.

Some of the components of the dialogue system 100 may be provided in the vehicle 200 and some of the components may be provided in a remote server to partially perform operations of the dialogue system 100 in the vehicle 200 and the remote server.

Figure 2:
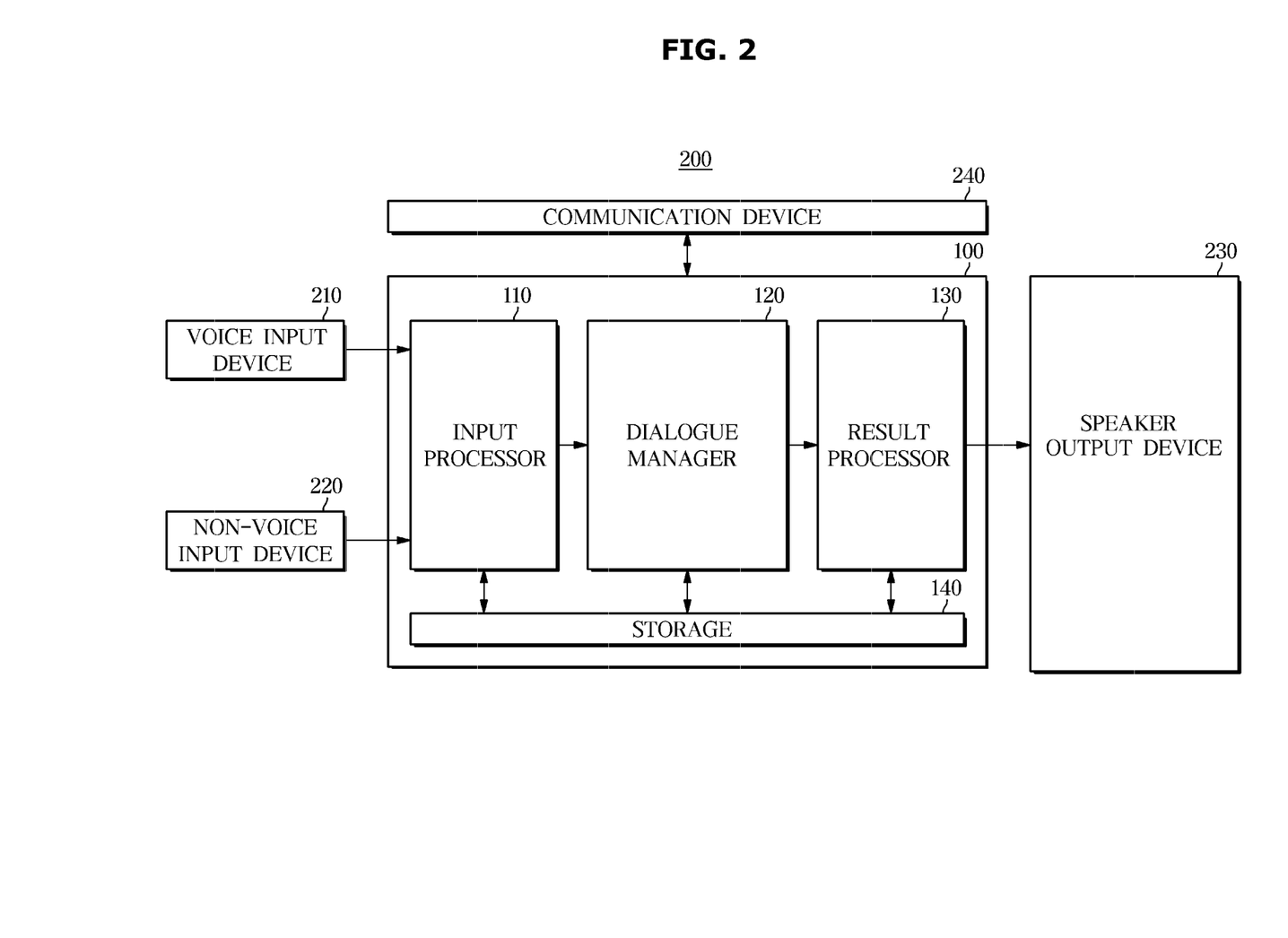
FIG. 2 is a control block diagram of the vehicle according to an embodiment of the present disclosure.

FIG. 2 is a control block diagram of the vehicle according to an embodiment of the present disclosure.

Referring to FIG. 2, the vehicle 200 according to an embodiment may include the voice input device 210, the non-voice input device 220, the communication device 240, the speaker output device 230, and the dialogue system 100. The dialogue system 100 may include an input processor 110, a dialogue manager 120, a result processor 130, and a storage 140.

The input processor 110 may process not only voice of the user or voice of the telephone conversation that is transmitted from the voice input device 210 but also non-voice input transmitted from the non-voice input device 220.

The input processor 110 may also process input that includes information related to the vehicle or information related to the user that is transmitted from the non-voice input device 220.

The input processor 110 may recognize the input user voice or the voice of the telephone call received by the user terminal 300, i.e., the voice of the other party of the telephone call, and convert it into a text-type utterance. The input processor 110 may determine the intention of the user or the other party of the telephone call by applying a Natural Language Understanding algorithm to the utterance. The intention of the user or the other party of the phone call determined by the input processor 110 may include the subject of the conversation or the subject of the telephone call determined based on the utterance.

At least one of the text-type utterance or the intention of the user or the other party of the telephone call may be output by the input processor 110 as a voice recognition result. The input processor 110 may transmit the voice recognition result to the dialogue manager 120.

To this end, the input processor 110 may include a voice recognition module and may be implemented as one or more hardware components of a computer system (i.e., a computer processor) that performs an operation to process the input voice.

The voice processing operation of the input processor 110 may be performed on condition that a voice is input. The voice processing operation may be performed only when a specific condition is satisfied even if a voice is inputted.

In this case, the input processor 110 may recognize the voice of the telephone call and perform the above-described voice processing operation when a telephone call delegation command for the telephone received by the user terminal 300 is received.

The telephone call delegation command does not mean that the user directly conducts a call with the other party of the telephone call but refers to a command for the dialogue system 100 to answer a telephone call from the other party of the telephone call. In other words, the telephone call delegation command refers to a command to perform a conversation with the other party of the telephone call. The telephone call delegation command may be received from the user through the voice input device 210 or the non-voice input device 220.

The dialogue manager 120 may determine the intention of the user or the intention of the other party of the telephone call using the voice recognition result as a processing result of the input processor 110. The dialogue manager 120 may determine an action corresponding to the intention. The dialogue manager 120 may transmit information related to the determined action to the result processor 130.

The dialogue manager 120 may also determine the conversation contents or phone call contents using the voice recognition result. The dialogue manager may determine whether to provide the phone call contents to the user based on the phone call contents.

The dialogue manager 120 may summarize the conversation contents or the phone call contents using the voice recognition result. The dialogue manager 120 may extract keywords from the conversation contents or the phone call contents and may summarize the phone call contents based on the extracted keywords.

The dialogue manager 120 may store the phone call contents determined based on the voice recognition result in the storage 140 and may provide the phone call contents to the user at a predetermined point.

The dialogue manager 120 may also determine whether a decision making is necessary based on the voice recognition result. The dialogue manager 120 may ask the user for confirmation when a decision making is necessary. In this case, the dialogue manager 120 may determine that a decision making is necessary when the other party of the telephone call requests the user's answer.

Specifically, the dialogue manager 120 may determine whether or not the other party of the telephone call requests the user's answer based on the word corresponding to the end of the voice recognition result regarding the utterance of the other party of the telephone call or the word included in the voice recognition result.

For example, when the user is questioned (in a case where the other party of the telephone call says 'are you at work currently?') or the user's consent is requested (in a case where the other party of the telephone call says 'Do you agree?'), the dialogue manager 120 may determine that a decision making is necessary and may request for confirmation of a decision of the user.

The user may input a user command in response to the request for the decision confirmation. The dialogue manager 120 may answer a telephone call based on the input user command.

The user command may include at least one of a decision confirmation command, a direct telephone call command, or a telephone call termination command of the user. The dialogue manager 120 may continue, interrupt, or terminate the telephone call based on the decision of the user confirmed based on the type of the input user command.

Specifically, the user may cause the dialogue manager 120 to answer a telephone call based on the decision confirmed by inputting the decision confirmation command. Also, the user may directly answer a telephone call by inputting the direct telephone call command. In this case, the telephone call execution of the dialogue manager 120 may be interrupted. In addition, the user may terminate the telephone call by inputting the telephone call termination command.

The dialogue manager 120 may also determine whether or not the telephone call contents are useful to the user based on the telephone call contents. The dialogue manager 120 may provide the user with only the contents of the telephone call determined to be useful to the user.

To this end, the dialogue manager 120 may determine a recommendation score for the telephone call contents based on the telephone call contents. The recommendation score refers to a measure of the usefulness of the telephone call contents for the user.

Specifically, the dialogue manager 120 may compare the telephone call contents and the user information and may determine the recommendation score based on the comparison result. The user information refers to information for estimating matters of the user's interest. The user information may not only include personal information such as the user's gender, age, residence, and workplace, but also include various kinds of information for estimating matters of the user's interest such as functions frequently used by the user and information related to keywords recently searched by the user.

The user information may be collected from at least one of the user terminal 300, an external device, or the vehicle 200 through the communication device 240. The user information may be stored in the storage 140.

In addition, the user information may be preset by the user, the user may input the keyword indicating a matter of interest through the voice input device 210 or the non-voice input device 220. The keyword information may be stored in the storage 140.

The dialogue manager 120 may determine the relevance between the telephone call contents and the user information by comparing the telephone call contents and the user information and may determine recommendation scores in order of high relevancy.

Specifically, the dialogue manager 120 may determine the relevance between the keywords included in the telephone call contents and the keywords included in the user information. The dialogue manager 120 may determine recommendation scores in order of high relevancy.

The dialogue manager 120 may compare the recommendation score for the telephone call contents with a predetermined first reference score and provide the telephone call contents to the user based on the comparison result.

When the recommendation score exceeds the predetermined first reference score, the dialogue manager 120 may transmit a telephone call content providing command to the speaker output device 230 through the result processor 130 to provide the call contents to the user.

The dialogue manager 120 may also recommend a telephone call to the user when the recommendation score exceeds a predetermined second reference score. The second reference score may be a score having a value larger than the first reference score. However, the present disclosure is not limited thereto, and the second reference score may be a score having a value equal to or smaller than the first reference score.

The dialogue manager 120 may determine an action for recommending a telephone call to the user and may transmit the action to the result processor 130.

The user may answer a direct telephone call with the other party of the telephone call in response to the telephone call recommendation and may receive information by listening directly to the information determined to be useful.

The dialogue manager 120 may determine whether or not a telephone call end point has been reached based on the voice recognition result and terminate the telephone call when the telephone call end point is reached. At this time, the dialogue manager 120 may terminate the telephone call and at the same time provide the telephone call contents to the user.

Specifically, the dialogue manager 120 may determine whether or not the other party of the telephone call has completed the information transmission based on the word corresponding to the end of the voice recognition result regarding the utterance of the other party of the telephone call or the word included in the voice recognition result.

For example, when the other party of the telephone call utters a predetermined greeting (in the case of saying 'thank you') to the user, the dialogue manager 120 may determine that the utterance is the point in time when the other party of the telephone call completes the information transmission, that is, the telephone call end point.

When the telephone call end point is not reached, the dialogue manager 120 may determine an action to continue the telephone call with the other party of the telephone call and may transmit the determined action to the result manager 130.

The action to continue the telephone call, which is an action to utter a simple answer to the other party of the telephone call, refers to an action to utter a simple answer indicating that the utterance of the other party of the telephone call is listening in a situation where a decision making is not necessary.

For example, when the telephone call end point is not reached, the dialogue manager 120 may determine the 'conversation continuation' as an action. A simple answer utterance command for this action may be transmitted to the speaker output device 230 through the result processor 130. The speaker output device 230 may continue the telephone call with the other party of the telephone call by uttering a simple answer such as 'yes' and 'well'.

To this end, the dialogue manager 120 may be implemented as one or more hardware components of a computer system (i.e., a computer processor) that performs the above-described operations.

The result processor 130 may output a system utterance for providing a specific service or continuing conversation according to the output result of the dialogue manager 120.

The result processor 130 may generate a conversation response and a command word necessary to perform the transmitted action and may output the command word. The conversation response may be output as text, image, or audio, and when the command is output, services such as vehicle control and external content provision corresponding to the output command may be performed.

The result processor 130 may transmit the generated command to the speaker output device 230 so that the speaker output device 230 outputs the operation corresponding to the command.

The result processor 130 may generate various commands such as a telephone call content providing command, a user confirmation request command, a telephone call recommendation command, or a telephone call continuation command based on the information including the action received from the dialogue manager 120. The result processor 130 may also transmit the command to the speaker output device 230.

The output of the result processor 130 is input to the speaker output device 230 to enable the vehicle 200 to provide a necessary service to the user. Alternatively, it may be transmitted to an external content server to request the necessary service.

To this end, the result processor 130 may be implemented as one or more hardware components of a computer system (i.e., a computer processor) that performs the above-described operations.

The storage 140 may store various kinds of information related to functions provided by the vehicle 200.

To this end, the storage 140 may be implemented as at least one of a non-volatile memory device such as a cache, a ROM (Read Only Memory), a PROM (Programmable ROM), an EPROM (Erasable Programmable ROM), an EEPROM (Electrically Erasable Programmable ROM), and a flash memory, a volatile memory device such as a RAM (Random Access Memory), and a storage medium such as a HDD (hard disk drive) and a CD-ROM, but is not limited thereto. The storage 140 may be a memory implemented as a chip separate from the above-described processor in connection with the dialogue system 100. The storage 140 may be also implemented as a single chip with the processor. The storage 140 may be coupled to the processor and may store executable instructions that when executed by the processor may cause the vehicle to perform the above-described operations.

At least one component may be added or deleted corresponding to the performance of the components of the vehicle 200 illustrated in FIGS. 1 and 2. It will be readily understood by a person having ordinary skill in the art that the mutual position of components may be changed corresponding to the performance or structure of a system.

Each of the components illustrated in FIGS. 1 and 2 refers to a hardware component such as software and/or a Field Programmable Gate Array (FPGA) and an Application Specific Integrated Circuit (ASIC).

Figure 3:
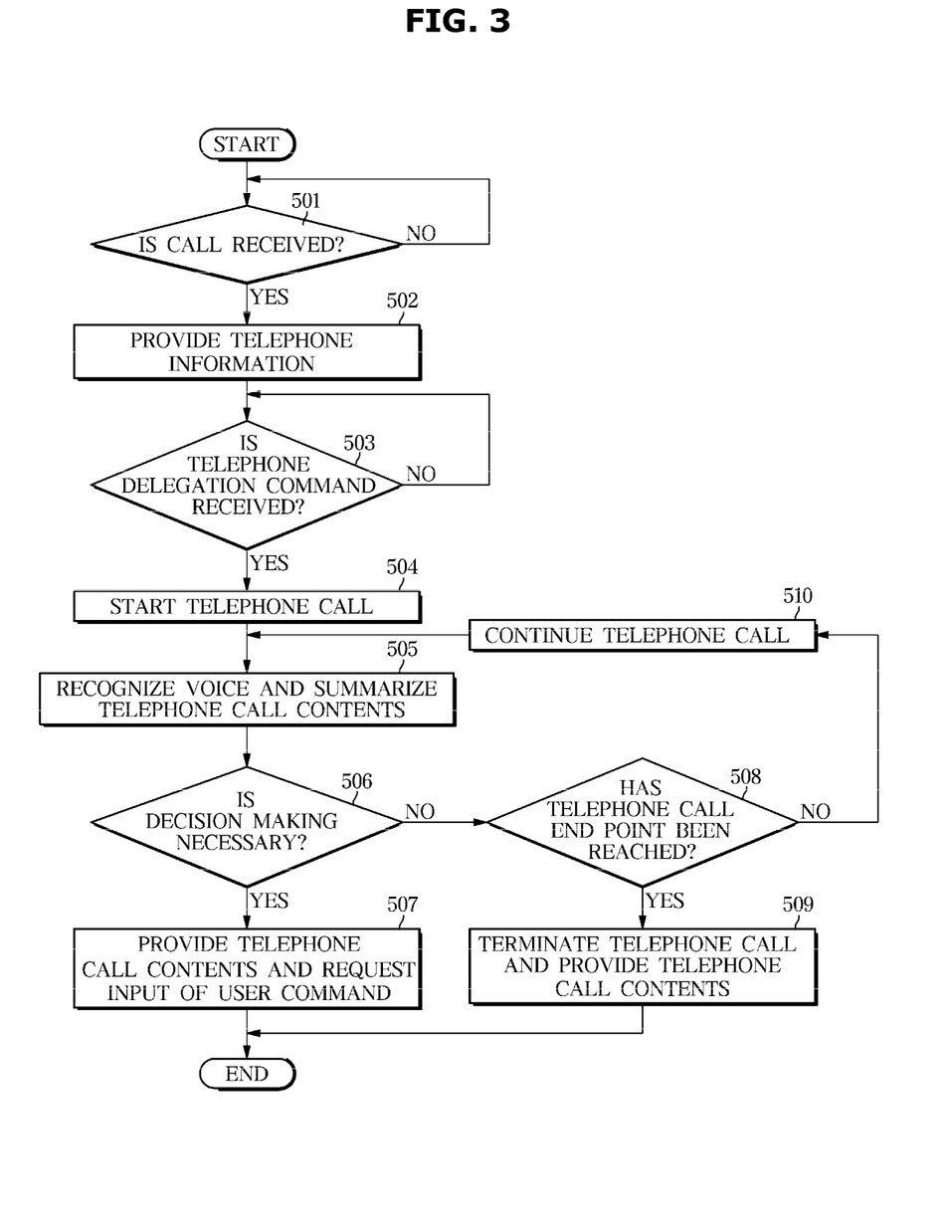
FIG. 3 is a flowchart of a control method of the vehicle according to an embodiment of the present disclosure.

FIG. 3 is a flowchart of a control method of the vehicle according to an embodiment of the present disclosure.

Referring to FIG. 3, the vehicle 200 according to an embodiment of the present disclosure may confirm whether or not the user terminal 300 receives a call (501).

When the user terminal 300 receives the call (YES in 501), the vehicle 200 may provide telephone information (502). The telephone information may include a calling number of the received call. In addition, the telephone information may further include information related to the caller.

Simultaneously with providing the telephone information, the vehicle 200 may request whether or not to input a telephone delegation command and may confirm whether or not the telephone delegation command is received (503).

The telephone delegation command does not mean that the user directly conducts a call with the other party of the telephone call, but refers to a command for the vehicle 200 to answer a telephone call with the other party of the telephone call. In other words, the telephone delegation command refers to a command to perform a conversation with the other party of the telephone call. The telephone delegation command may be received from the user through the voice input device 210 or the non-voice input device 220.

When the telephone delegation command is received (YES in 503), the vehicle 200 may start a telephone call with the other party of the received telephone call (504).

The vehicle 200 may recognize the voice of the other party of the telephone call and may summarize the telephone call contents based on the voice recognition result (505).

Specifically, the vehicle 200 may recognize the voice of the other party of the telephone call and convert it into a text-type utterance. The vehicle 200 may further determine the intention of the user or the other party of the telephone call by applying a Natural Language Understanding algorithm to the utterance. At this time, the intention of the user or the other party of the phone call determined by the vehicle 200 may include the subject of the conversation or the subject of the telephone call determined based on the utterance.

The vehicle 200 may determine telephone call contents based on the voice recognition result including at least one of the text-type utterance or the intention of the user or the other party of the telephone call. The vehicle 200 may summarize the determined telephone call contents.

Specifically, the vehicle 200 may extract keywords from the telephone call contents and may summarize the telephone call contents based on the extracted keywords.

The vehicle 200 may confirm whether or not a decision making is necessary (506). Specifically, the vehicle 200 may determine whether or not a decision making is necessary based on the voice recognition result.

The vehicle 200 may determine whether or not the other party of the telephone call requests the user's answer based on the word corresponding to the end of the voice recognition result regarding the utterance of the other party of the telephone call or the word included in the voice recognition result. The vehicle 200 may determine that a decision making is necessary when the other party of the telephone call requests the user's answer.

For example, when the user is questioned (i.e., when the other party of the telephone call says: "Are you at work currently?") or the user's consent is requested (i.e., when the other party of the telephone call says: "Do you agree?"), the vehicle 200 may determine that a decision making is necessary.

When a decision making is necessary (YES in 506), the vehicle 200 may provide the user with the telephone call contents and may request input of a user command. In this case, the user may input the user command so that the telephone call is answered according to the user's decision (507).

The user command may include at least one of a decision confirmation command, a direct telephone call command, or a telephone call termination command of the user. The vehicle 200 may continue, interrupt, or terminate the telephone call based on the decision confirmed by the user based on the type of the user input command.

Specifically, the user may cause the vehicle 200 to answer a telephone call, based on the decision confirmed by inputting the decision confirmation command. Also, the user may directly answer a telephone call by inputting the direct telephone call command. In this embodiment, the telephone call execution of the vehicle 200 may be interrupted. In addition, the user may terminate the telephone call by inputting the telephone call termination command.

In another example, when a decision making is not necessary (NO in 506), the vehicle 200 may confirm whether or not the telephone call end point has been reached (508).

Specifically, the vehicle 200 may determine whether or not the other party of the telephone call has completed the information transmission based on the word corresponding to the end of the voice recognition result regarding the utterance of the other party of the telephone call or the word included in the voice recognition result.

For example, when the other party of the telephone call utters a predetermined greeting (in the case of saying 'thank you') to the user, the vehicle 200 may determine that the utterance is the point in time when the other party of the telephone call completes the information transmission, in other words, the telephone call end point.

When it is confirmed that the telephone call end point has been reached (YES in 508), the vehicle 200 may terminate the telephone call and provide the user with the telephone call contents (509).

In another example, when the telephone call end point is not reached (NO in 508), the vehicle 200 may continue the telephone call (510).

At this time, the vehicle 200 may utter a simple answer to continue the telephone call with the other party of the telephone call. The vehicle 200 may continue the telephone call with the other party of the telephone call by uttering a simple answer indicating that the utterance of the other party of the telephone call is listening in a situation where a decision making is not necessary.

The process 506 for determining whether or not a decision making is necessary may be performed simultaneously with the process 505.

Through this process, the contents of the received telephone call may be provided without the user performing the telephone call directly, so that convenience for the user may be increased.

Figure 4:
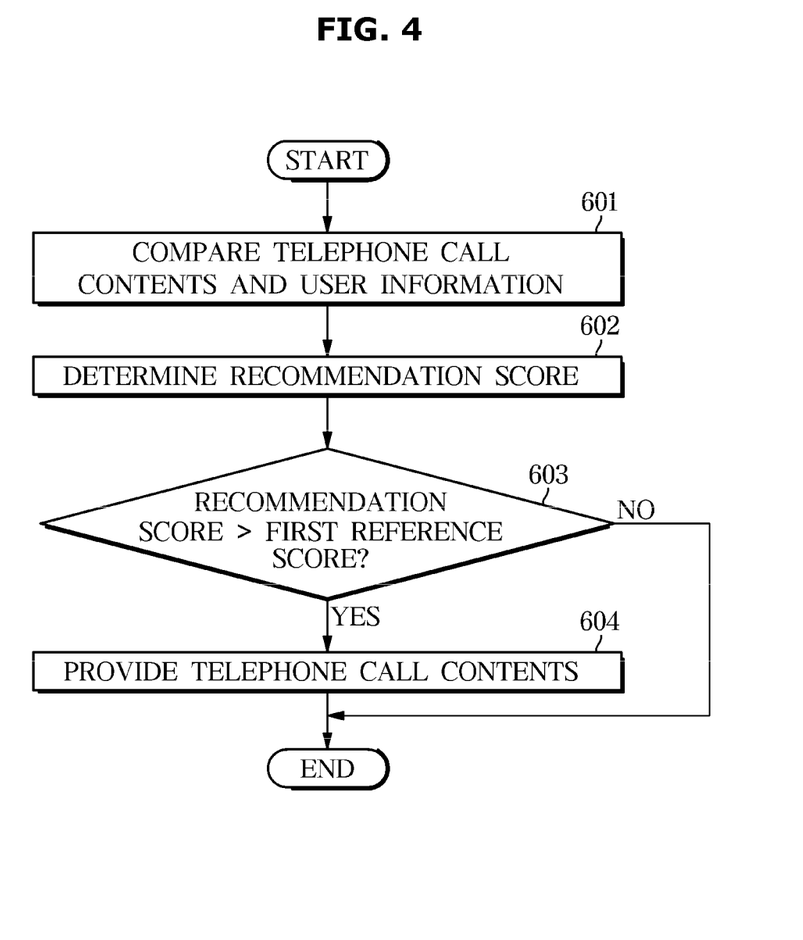
FIG. 4 is a flowchart of a control method of the vehicle according to an embodiment of the present disclosure.

FIG. 4 is a flowchart of a control method of the vehicle according to an embodiment of the present disclosure.

Referring to FIG. 4, the vehicle 200 according to another embodiment of the present disclosure may compare the telephone call contents and the user information (601).

The user information refers to information for estimating matters of the users interest. The user information may not only include personal information such as the user's gender, age, residence, and workplace, but also include various kinds of information for estimating matters of the user's interest such as functions frequently used by the user and information related to keywords recently searched by the user.

The user information may be collected from the user terminal 300 or an external device and may be preset by the user. The user may input keywords indicating matters of interest through the voice input device 210 or the non-voice input device 220. The keyword information may be stored in the storage 140.

Thereafter, the vehicle 200 may determine a recommendation score based on the comparison result of the telephone call contents and the user information (602).

The vehicle 200 may determine the relevance between the telephone call contents and the user information based on the comparison result of the telephone call contents and the user information and may determine recommendation scores in order of high relevancy.

Specifically, the vehicle 200 may determine the relevance between the keywords included in the telephone call contents and the keywords included in the user information and may determine recommendation scores in order of high relevancy.

The vehicle 200 may confirm whether or not the recommendation score for the telephone call contents exceeds the predetermined first reference score (603).

When the recommendation score exceeds the predetermined first reference score (YES in 603), the vehicle 200 may provide the telephone call contents to the user (604).

The vehicle 200 may also recommend a telephone call to the user when the recommendation score exceeds the predetermined second reference score. The second reference score may be a score having a value larger than the first reference score. However, the present disclosure is not limited thereto, and the second reference score may be a score having a value equal to or smaller than the first reference score.

The operation of FIG. 4 may be performed simultaneously with the process 507 of FIG. 3 described above. In this case, when it is confirmed that a decision making is necessary (YES in 506 in FIG. 3), the vehicle 200 may compare the telephone call contents and the user information (601) and determine recommendation scores (602), and may, when the recommendation score exceeds the predetermined first reference score (YES in 603), provide the telephone call contents to the user (604).

Through these processes, the usefulness of the information provided by the received telephone call may be determined without the user answering the telephone call directly and by providing only useful information to the user, so that convenience for the user may be increased.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes all kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, according to a vehicle and a control method of the vehicle according to an aspect of the present disclosure a user can receive useful information without the user answering a telephone call directly, so that convenience for the user can be increased.

The embodiments disclosed with reference to the accompanying drawings have been described above. It will be understood by a person having ordinary skill in the art that various changes in form and details may be made therein without departing from the spirit and scope of the disclosure as defined by the appended claims. The disclosed embodiments are illustrative and should not be construed as limiting.

What is claimed is:

1. A vehicle comprising:
   a communication device configured to communicate with a user terminal;
   an input processor configured to, in response to communication with the user terminal receiving a telephone call, recognize a voice of a caller of the telephone call received by the user terminal and generate a voice recognition result based on the voice of the caller; and
   a dialogue manager, wherein the dialogue manager is configured to
      answer the telephone call based on an input command by a user,
      determine telephone call contents of the caller based on the voice recognition result and determine whether or not to provide the telephone call contents to the user based on an interest of the user in the telephone call contents,
      determine a recommendation score for the telephone call contents based on the telephone call contents,
      determine whether or not to provide the telephone call contents to the user based on the recommendation score, and
      provide a portion of the telephone call contents to the user when the recommendation score exceeds a predetermined reference score.

2. The vehicle according to claim 1, wherein
the dialogue manager determines whether or not a decision making is necessary based on the voice recognition result and requests the user to input a confirmation command when the decision making is necessary.

3. The vehicle according to claim 2, wherein
the dialogue manager determines that the decision making is necessary when the caller of the telephone call requests an answer of the user.

4. The vehicle according to claim 1, wherein
the dialogue manager compares the telephone call contents and user information and determines the recommendation score based on the comparison result.

5. The vehicle according to claim 1, wherein
the dialogue manager provides the telephone call contents to the user when the recommendation score exceeds a predetermined reference score.

6. The vehicle according to claim 1, wherein
the dialogue manager determines whether or not a telephone call end point has been reached based on the voice recognition result and terminates the telephone call when the telephone call end point is reached.

7. The vehicle according to claim 6, wherein
the dialogue manager provides the telephone call contents to the user when the telephone call end point is reached.

8. The vehicle according to claim 1, wherein
the input processor recognizes the voice of the caller of the telephone call when a telephone call delegation command for the telephone call received by the user terminal is received.

9. A control method of a vehicle comprising:
answering, by a dialogue manager, a telephone call based on an input command by a user;
in response to communication with a user terminal receiving the telephone call, recognizing, by the dialogue manager, a voice of a caller of the telephone call received by the user terminal;
generating, by the dialogue manager, a voice recognition result based on the voice of the caller;
determining, by the dialogue manager, telephone call contents of the caller based on the voice recognition result;
determining, by the dialogue manager, whether or not to provide the telephone call contents to the user based on the telephone call contents;
determining, by the dialogue manager, a recommendation score for the telephone call contents based on an interest of the user in the telephone call contents;
determining, by the dialogue manager, whether or not to provide the telephone call contents to the user based on the recommendation score; and
providing, by the dialogue manager, a portion of the telephone call contents to the user when the recommendation score exceeds a predetermined reference score.

10. The control method according to claim 9, further comprising:
determining whether or not a decision making is necessary based on the voice recognition result; and
requesting the user to input a confirmation command when the decision making is necessary.

11. The control method according to claim 10, wherein
the determining of whether or not a decision making is necessary includes determining that the decision making is necessary when the caller of the telephone call requests an answer of the user.

12. The control method according to claim 9, wherein
the determining of the recommendation score for the telephone call contents includes comparing the telephone call contents and user information and determining the recommendation score based on the comparison result.

13. The control method according to claim 9, wherein
the determining of whether or not to provide the telephone call contents to the user based on the recommendation score includes providing the telephone call contents to the user when the recommendation score exceeds a predetermined reference score.

14. The control method according to claim 9, further comprising:
determining whether or not a telephone call end point has been reached based on the voice recognition result; and
terminating the telephone call when the telephone call end point is reached.

15. The control method according to claim 14, wherein
the terminating of the telephone call includes providing the telephone call contents to the user when the telephone call end point is reached.

16. The control method according to claim 9, wherein
the generating of the voice recognition result based on the voice of the telephone call includes recognizing the voice of the caller when a telephone call delegation command for the telephone call received by the user terminal is received.

* * * * *